United States Patent [19]
Takada, deceased et al.

[11] 3,991,953
[45] Nov. 16, 1976

[54] AUTOMATIC LOCKING SAFETY BELT RETRACTOR

[75] Inventors: Takeso Takada, deceased, late of Hikone, Japan; by Juichiro Takada, legal heir, Tokyo, Japan

[73] Assignee: Takata Kojyo Co. Ltd., Tokyo, Japan

[22] Filed: June 14, 1974

[21] Appl. No.: 479,690

[30] Foreign Application Priority Data

June 21, 1973 Japan............................ 48-069218

[52] U.S. Cl. .................... 242/107.4 A; 242/107.4 B
[51] Int. Cl.² ................... A62B 35/00; B65H 75/48
[58] Field of Search ............ 242/107.4 A, 107.4 B; 297/388; 280/744–747

[56] References Cited
UNITED STATES PATENTS

| | | | |
|---|---|---|---|
| 3,450,368 | 6/1969 | Glauser et al. | 242/107.4 |
| 3,552,676 | 1/1971 | Weber | 242/107.4 A |
| 3,632,056 | 1/1972 | Hibbard et al. | 242/107.4 |
| 3,819,126 | 6/1974 | Stoffel | 242/107.4 |
| 3,851,835 | 12/1974 | Fohl | 242/107.4 |
| 3,858,824 | 1/1975 | Stephenson | 242/107.4 |
| 3,907,227 | 9/1975 | Takada | 242/107.4 B |

*Primary Examiner*—Stanley N. Gilreath
*Assistant Examiner*—John M. Jillions
*Attorney, Agent, or Firm*—Wolder & Gross

[57] ABSTRACT

An automatic locking safety belt retractor includes a bracket supporting a belt retracting reel provided with end first ratchet wheels and a first pawl member swingable into locking engagement with the ratchet wheel and spring biased out of engagement. A second ratchet wheel is rockable relative to the reel and is connected to the first pawl to advance it with advance of the second ratchet wheel. A cam rotates with the reel shaft and a second pawl carrying inertia wheel is rotatable on the shaft, the second pawl engaging the second ratchet wheel when the inertia wheel lags the cam to thereby advance the second ratchet wheel and lock the reel. A third ratchet wheel is rotatable with the inertia wheel and an inertia sensing pendulum, when actuated, advances a locking pawl into locking engagement with the third ratchet wheel to lock the reel. The acceleration required to actuate the pendulum sensor is less than that required to lock the reel, due to the inertia lag of the inertia wheel.

2 Claims, 4 Drawing Figures

AUTOMATIC LOCKING SAFETY BELT RETRACTOR

BACKGROUND AND SUMMARY OF THE INVENTION

The present invention relates generally to improvements in vehicle safety belt systems, and it relates more particularly to an improved inertia actuated automatic locking vehicle safety belt retraction reel.

In emergency locking retractors of the type used with a vehicle safety belts and designed to prevent extraction or withdrawal of the belt under emergency conditions, such as a collision, overturning and sudden stop, it is a known practice to lock the belt against extraction in response to the inertial force of rotation that is produced by the safety belt as it is suddenly unreeled in such an emergency, as a result of the sudden forward movement of the vehicle seat occupant's body. When the acceleration sensing capacity of a retractor of this kind is of such a range that a rather low acceleration, such as 0.3G, may be sensed, the inertia unit is activated even when the passenger suddenly, rapidly, withdraws the belt with the intention of applying the belt. With actuation of the inertia unit, the belt is locked, and the passenger may occasionally dispense with the application of the safety belt. In a retractor in which the vehicle acceleration and deceleration produced at the time of collision or other accident is sensed for locking the belt, when the sensing unit is installed in the retractor itself and must have a wide sensing range, such as 0.3 to 1.0G, the retractor is excessive in size and occupies too much space in the vehicle body. When the sensing unit of this type is installed separately from the retractor, it is necessary to provide an electrical network within the vehicle so that, in some kinds of vehicles, it is impossible to provide the vehicle with the retractor device.

The present invention contemplates the provision of an automatic locking retraction reel in which an acceleration in the range, for example, from 0.3 to 1.0G which requires a higher sensing capacity is sensed by a pendulum unit to effect the locking of the safety belt, and an acceleration beyond, for example, 0.7G is sensed by an inertia unit for correspondingly locking the belt. Therefore, when the passenger desires to apply the safety belt, it can be freely extracted without locking even at a very high withdrawal speed. At a lower range of acceleration as produced, for instance, in the case of a sudden stop or tilt of the vehicle, the belt is locked by operation of the pendulum sensing unit. At a very high rate of acceleration as produced, for instance, in the case of a collision, the inertia unit is actuated due to the sudden movement of the seat occupant's body and the resulting extraction of the safety belt, so that the belt is automatically locked. While the retractor of the present invention is equipped with two sensing units, namely, the pendulum sensing unit and the inertia sensing unit, almost all of the component parts are used in common for the two sensing units and other units of the retractor, so that the production cost can be low, despite the use of the dual safety system. In addition, the retractor can be mounted conveniently in any vehicle because electrical devices and wiring are obviated.

DESCRIPTION OF THE PREFERRED EMBODIMENT

Figure 1:
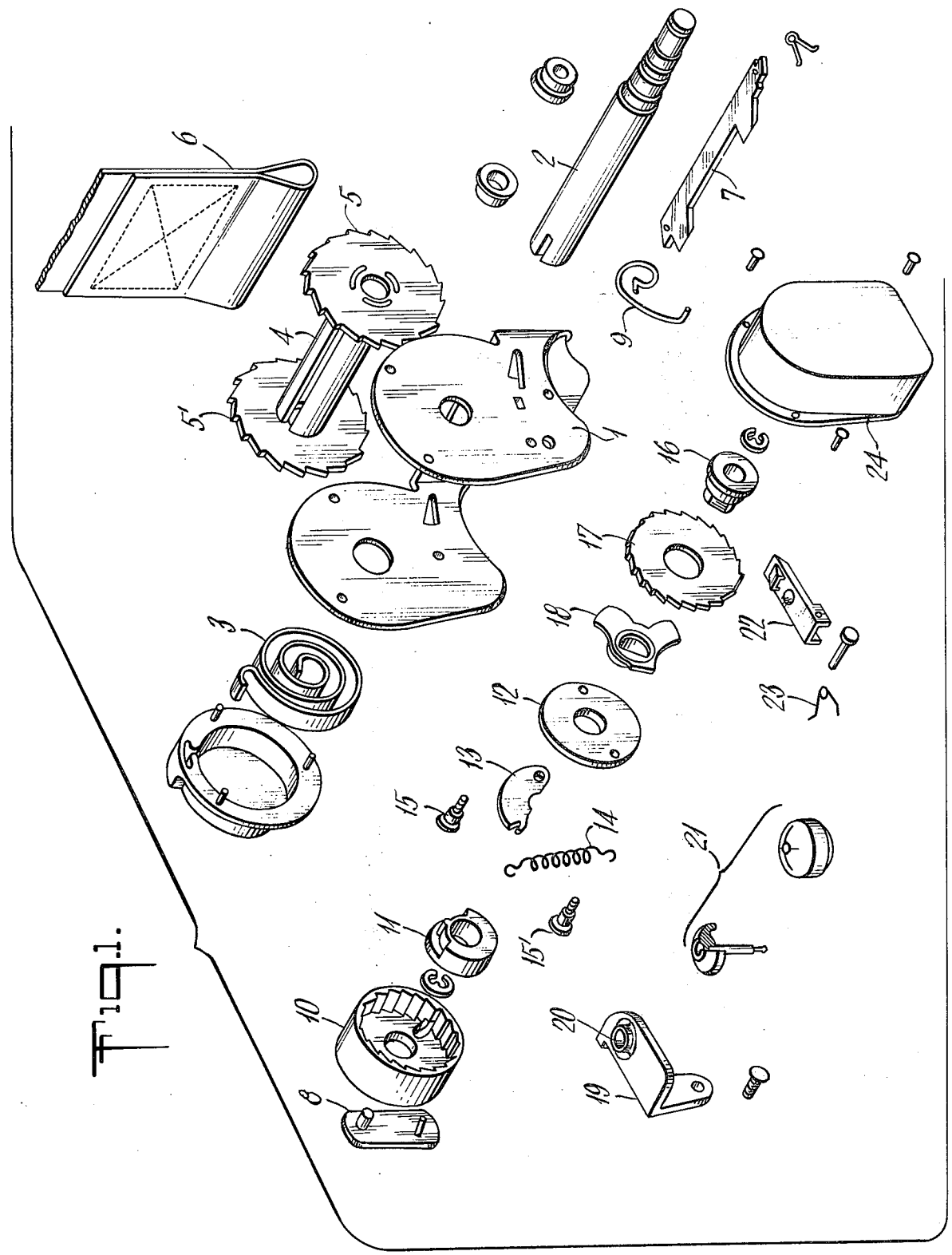
FIG. 1 is an exploded perspective view of a retractor reel embodying the present invention.
Figure 4:
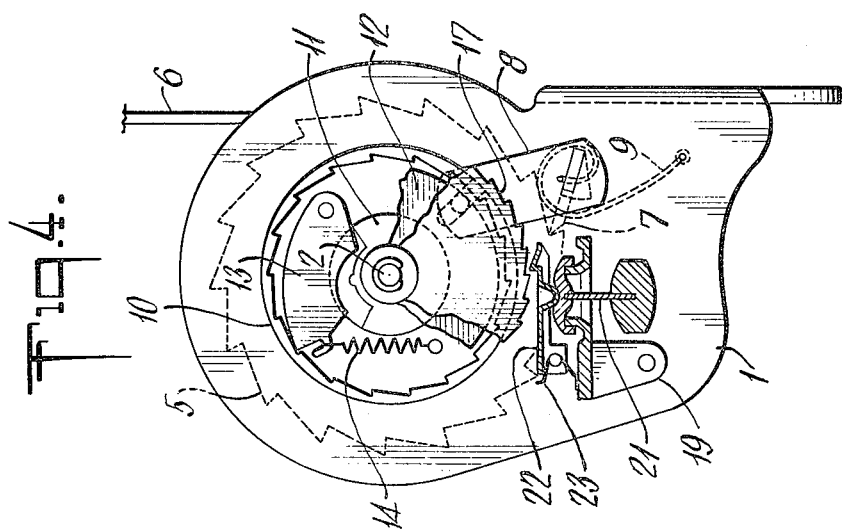
FIG. 4 is a view similar to FIG. 2 with the extractor reel illustrated in a belt locked condition as effected by the reel acceleration sensor.

Referring now to the drawings which illustrate a preferred embodiment of the present invention, the reference numeral 1 generally designates a U-shaped frame or hachet including a cross web or bottom plate and a pair of parallel side plates, a shaft 2 being journalled between the two side plates.

A spiral coil spring 3 has at its outer end secured to the outer surface or a similar stationary part of one of the side plates of the frame 1 and its inner end secured to shaft 2 so that the shaft 2 is urged to rotate in a direction for retracting the safety belt 6. The shaft 2 coaxially extends through a reel hollow drum 4 about which the belt 6 is wound and secured, as shown in FIG. 1. A pair of opposite coaxial ratchet wheels 5, 5' are secured to the shaft 2, as by press fitting. A pawl member 7 is rockably supported at both ends by both of the side plates of the frame 1 and is formed with two pawl projections which are movable into engagement with and disengaged from the teeth of the ratchet wheels 5, 5'. The pawl member 7 has one end matingly engaging a rectangular opening of a connecting plate or arm 8, and the plate 8 is secured to the pawl 7 by a cotter pin. The pawl 7 is engaged by a small spring 9 and biased thereby in a direction away from engagement with the ratchet wheels 5, 5'. The ratchet wheels 5, 5', the drum 4 and the pawl 7 constitute a locking unit. An internally toothed ratchet wheel 10 is rockably mounted and restricted against axial movement by an E-ring or the like on the stepped end section of the shaft 2 projecting from the frame 1. The toothed wheel 10 has a radially elongated slot slideably engaged by a pin located on the connecting plate 8 so that partial rotation or rocking of the internally toothed wheel 10 is transmitted directly to the pawl 7. A cam wheel 11 is peripherally contoured as shown and is suitably fixedly mounted to the shaft 2 within the space delineated by the internal teeth of the wheel 10.

An inertia wheel 12 mounted on a bushing 16, as will be hereinafter described, rockably carries a detent or pawl 13 and a detent biasing spring 14 as with stepped pins 15, 15'. The detent 13 is positioned within the recess between the cam wheel 11 and ratchet wheel 10 so as to be engageable with the teeth of the ratchet wheel 10 but being normally disengaged therefrom under the influence of the detent spring 14. The toothed wheel 10, cam wheel 11, detent 13 and the inertia wheel 12 constitute the inertia unit. On the stepped bushing 16, there are mounted in consecutive sequence, an externally toothed ratchet wheel 17, a spider or petal shaped spring 18 and the inertia wheel 12. The stepped bushing 16 is mounted together with the wheel 17, petal spring 18 and the wheel 12 on the stepped part of the shaft 2 contiguous to the cam wheel 11 and restricted against axial movement on the shaft 2 by an E-ring or like mounting means. The inertia wheel 12 and the externally toothed wheel 17 are slideable relative to the stepped bushing 16 with an adequate frictional force under the influence of the petal spring 18, which is interposed between the two members and secured to the bushing 16. The stepped bushing 16 constitutes a unit together with the inertia wheel, the petal shaped spring and the externally toothed wheel associated with the stepped bushing.

A pendulum bracket or pedestal 19 is secured as with a screw to the outer surface of a side plate of the frame 1 opposite to the coil spring 3 and approximately below the inertia unit. The pedestal 19 is formed integrally with a collar shaped pendulum rest 20, which serves as a fulcrum point for a pendulum 21. The pendulum 21 includes an upper hood having a circular rim disposed on the rest 20 and a pendulum weight secured to the lower end of the shank depending from the hood. The mass of the pendulum weight is so selected as to respond to a prescribed range of acceleration to tilt the shank. A sensor detent or pawl member 22 is pivotally mounted to the frame 1 by a long screw, not shown, and at a position directly above the pendulum pedestal 19. A small spring 23 is operatively associated with and engages the sensor detent member 22 and biases the latter into an abutting contact by a spherical projection formed on its lower surface with a mating recess formed on the upper surface of the pendulum 21. The sensor detent member 22 has a triangular prismatic projection on its upper face at a position below the externally toothed wheel 17 so as to engage the toothed wheel 17 when the sensor detent member 22 is rocked with the swinging movement of the pendulum 2. The pendulum pedestal 19, pendulum 21 and sensor detent 22 constitute a sensing unit for sensing the tilt and positive acceleration or negative acceleration or deceleration of the vehicle. The above inertia, slide and sensing units are accommodated within a suitable cover 24 which is fastened to the frame 1 as with screws, not shown.

Figure 3:
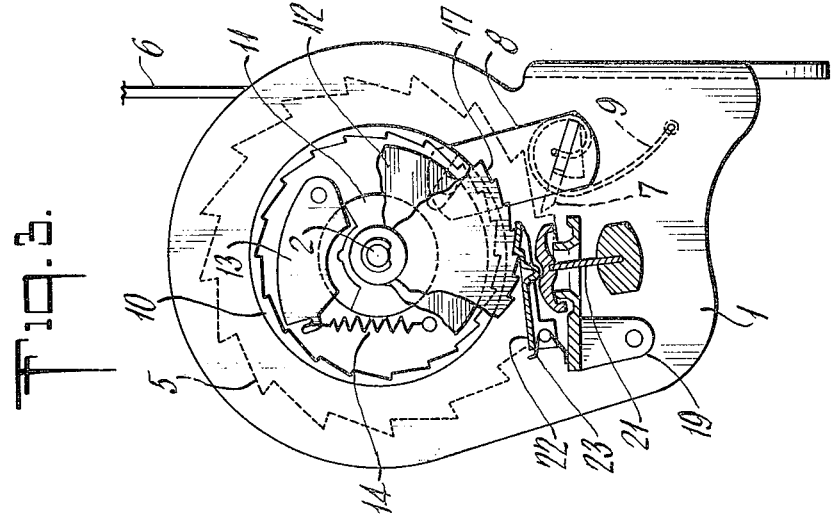
FIG. 3 is a view similar to FIG. 2 with the retractor reel illustrated in a belt locked condition as effected by the vehicle acceleration sensor.
Figure 2:
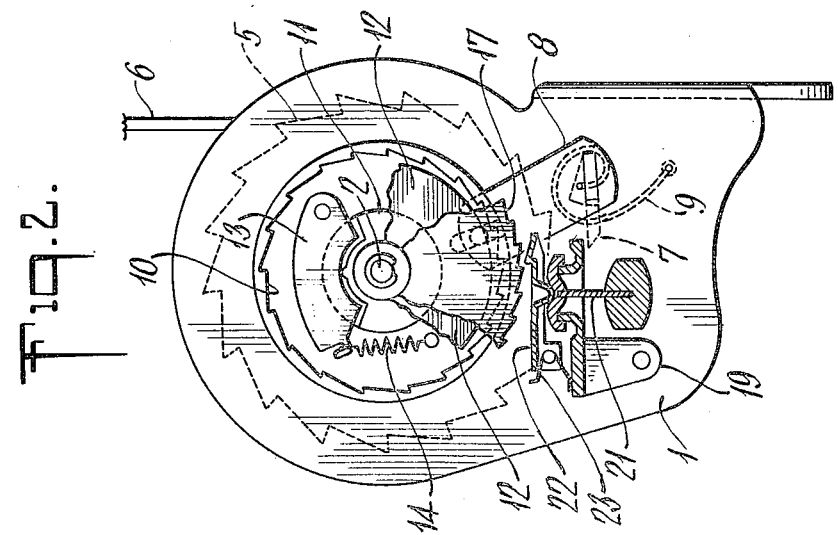
FIG. 2 is a side elevational view thereof, partially in section and fragmented and illustrating the retractor reel in an unlocked condition.

In the operation and application of the emergency lock retractor described above, the frame 1 is mounted in the interior of the vehicle, so that the pendulum 21 depends vertically under the horizontal parking and normal running conditions of the vehicle (FIG. 2), and the sensor detent 22 is disengaged under these conditions from the externally toothed wheel 17. The weight mass of the inertia wheel 12 and other factors are so selected that the detent 13 is retracted under the influence of the spring 14, unless the acceleration exceeds, for example, 0.7G. Thus, should the belt 6 be abruptly withdrawn, as when the passenger applies the safety belt, the aforesaid value of acceleration is not reached, and the shaft 2 is rotated together with the rotating members associated therewith. The pawl or detent 13 is not engaged with the toothed wheel 10 and hence the pawl 7 is not engaged with the ratchet wheels 5, 5' so that the belt 6 is not locked. Should an acceleration of the order of 0.3G to 0.7G be produced, as when the vehicle is suddenly stopped or tilted (FIG. 3), the pendulum 21 is tilted from its vertical or plumb position, and the sensor detent member 22 is thus rocked and engages the toothed wheel 17 against the influence of the spring 23. The force of acceleration is also applied to the seat occupant and the belt 6 is thus urged in an extraction direction, so that the shaft 2 and the cam wheel 11 mounted thereon are urged to rotate in spite of the resistance offered by the inertia unit. By rotation of the cam wheel 11, relative to the inertia wheel 12 which remains substantially stationary, the detent 13 is swung outwardly due to its engagement with the raised or actuating part of the cam wheel 11, and engages the toothed wheel 10, which is rocked thereby and operates to rock the pawl 7 by way of the connecting plate 8. The pawl projections of pawl 7 thus engage the ratchet wheels 5, 5' so that the reel and the belt 6 is locked against extraction. When an acceleration higher, for instance, than 0.7G is generated suddenly, as in a case of a vehicle collision, and the operation of the pendulum unit is rendered ineffective, the belt 6 is so abruptly and rapidly extracted that the speed of rotation of the inertia wheel 12 becomes lower than that of the shaft 2. The detent 13 is accordingly rocked by the cam wheel 11 and engages the toothed wheel 10, so that the belt 6 is now locked by operation of the internally toothed wheel 10, connecting plate 8, pawl 7 and ratchet wheels 5, 5'.

With the mechanism of the present invention, the belt is not locked when the seat occupant abruptly extracts the safety belt for the purpose of applying the belt, but is positively, reliably locked in case of an emergency when the dual safety system senses the shock applied to the vehicle and the emergency reeling out of the belt. The retractor of the present invention is reliable in operation and contributes greatly to the use of safety belts because of its totally mechanical structure.

While there has been described and illustrated a preferred embodiment of the present invention, it is apparent that numerous alterations, omissions and additions may be made without departing from the spirit thereof.

I claim:

1. A vehicle safety belt retractor device comprising a retractor reel spring biased to rotate in a belt retracting direction and including a shaft rotatable therewith, a first ratchet wheel rotatable with said reel, a first pawl member movable between positions engaging and disengaging said first ratchet wheel, a second ratchet wheel journalled on said shaft, means coupling said second ratchet wheel to said first pawl member to rock said first pawl member to its first ratchet wheel engage position with a predetermined rotation of said second ratchet wheel, a fly wheel rotatable in said shaft, a second pawl member mounted on said fly wheel and rockable between positions engaging and disengaging said second ratchet wheel and spring biased to a ratchet disengage position and including a follower portion, a cam member mounted on and rotatable by said shaft in engagement with said follower portion to shift said second pawl member into engagement with said second ratchet wheel upon said fly wheel lagging the rotation of said cam member whereby to rock said ratchet wheel and advance said first pawl member into engagement with said first ratchet wheel and characterized in the provision of a pendulum supported in a normally depending position and swingable to an advanced position in response to a predetermined acceleration of the vehicle to which the device is attached, a third ratchet wheel rotatably mounted on said shaft and drive coupled to said fly wheel, a third pawl member movable in and out of engagement with said third ratchet wheel and spring urged out of engagement therewith, and means responsive to the swinging of said pendulum to its advanced position for advancing said third pawl into engagement with said third ratchet wheel.

2. The vehicle safety belt retractor device of claim 1 including a spring member located on said shaft and located between and engaging said fly wheel and said third ratchet wheel.

* * * * *